Figure 1:
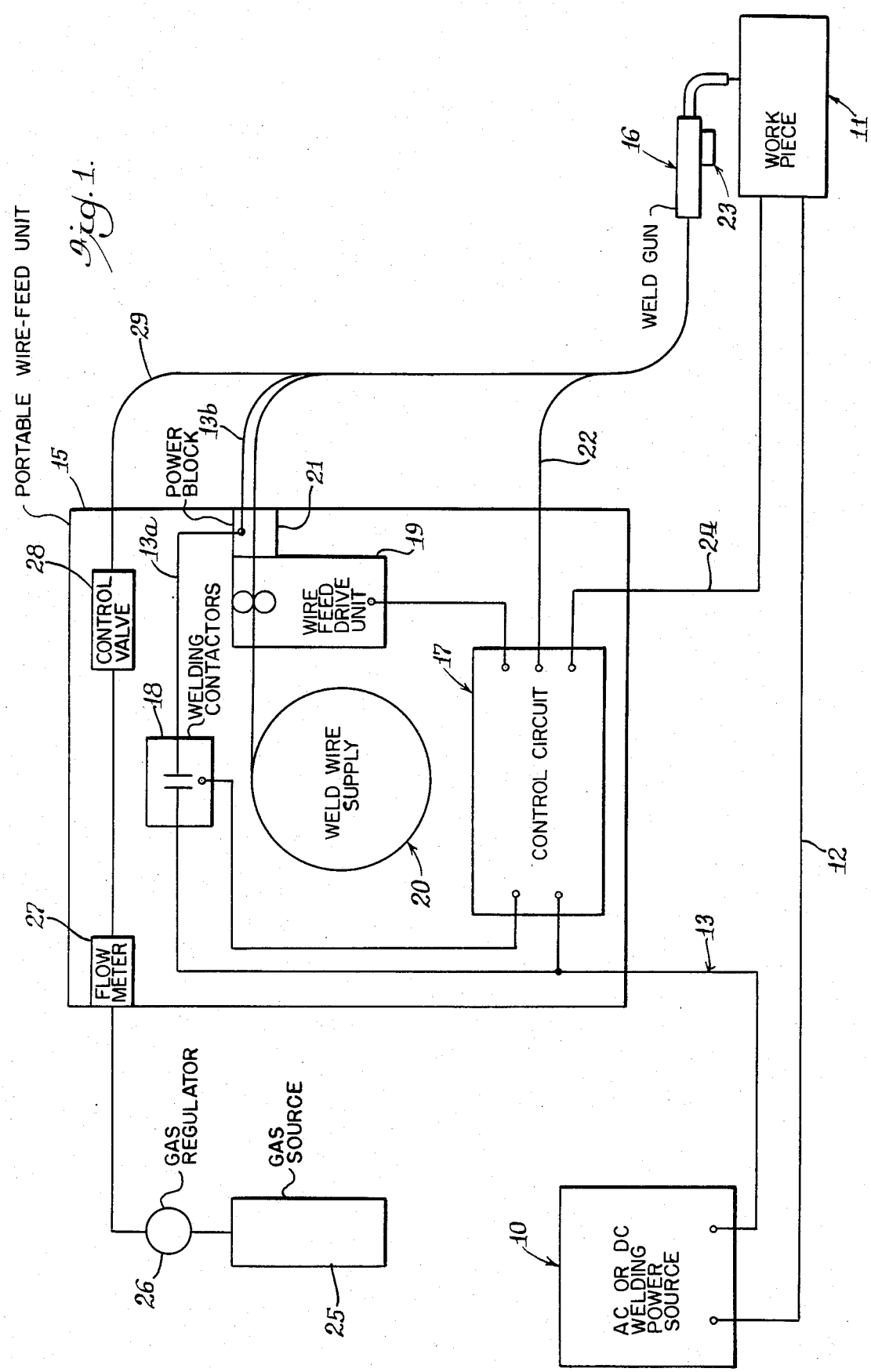

United States Patent [19]

Kroll

[11] Patent Number: 4,508,954
[45] Date of Patent: Apr. 2, 1985

[54] PORTABLE ARC VOLTAGE WIREFEED WELDING SYSTEM

[75] Inventor: Robert E. Kroll, Orland Park, Ill.

[73] Assignee: Oxo Welding Equipment Co., Inc., New Lenox, Ill.

[21] Appl. No.: 612,043

[22] Filed: May 18, 1984

[51] Int. Cl.³ .............................................. B23K 9/10
[52] U.S. Cl. .................................. 219/132; 219/136; 219/137.71
[58] Field of Search .................... 219/132, 137.71, 136

[56] References Cited

U.S. PATENT DOCUMENTS

| | | | |
|---|---|---|---|
| 3,248,516 | 4/1966 | Gilliland | 219/137.71 |
| 3,627,977 | 12/1971 | Aldenhoff | 219/137.71 |
| 4,119,830 | 10/1978 | Gilliland | 219/137.71 |
| 4,147,919 | 4/1979 | Matasovic | 219/132 |

FOREIGN PATENT DOCUMENTS 258903  5/1963  Australia ........................ 219/137.71

Primary Examiner—Clifford C. Shaw
Attorney, Agent, or Firm—McCaleb, Lucas & Brugman

[57] ABSTRACT

A portable wirefeed and control apparatus for use in consumable electrode arc welding systems which is capable of being powered by conventional AC or DC variable voltage or variable current supplies without modification of the power supply or the wirefeed and control apparatus. The portable wirefeed unit incorporates a wirefeed motor, a supply of weld wire, optional gas controls, and voltage regulating and protective control circuits all powered at welding arc voltage carried by the welding current supply conductor. The unit is circuit connected to the power supply by means of a single welding electrode supply conductor and a ground return. Electrode power, weld wire, optional shielding gas supply and welding gun control switch conductors are carried in a single flexible conduit extending between the control unit and a remote welding gun and wirefeed speed and thus wirefeed rate are partially responsive to variations in welding arc voltage.

6 Claims, 2 Drawing Figures

PORTABLE ARC VOLTAGE WIREFEED WELDING SYSTEM

This invention relates to arc welding in general and more particularly to improved portable wirefeed and welding control apparatus.

DESCRIPTION OF THE PRIOR ART

In remote welding systems of the consumable electrode or wirefeed type it is particularly desirable to minimize the number of electrical cables and conductors extending between a stationary power source and a remote portable wirefeed unit and a remote arc welding gun. Typically such remote welding systems embody one or more power supplies and a plurality of portable wirefeed units and welding guns. In certain installations an individual power supply is required for each remote welding gun. Conventionally such arc welding systems include a welding machine or power source (preferably a DC constant voltage type) having 0–600 volt alternating current input and 15–110 volt DC output. Generally such welding machines or power sources are equipped with internal contactors for controlling welding current and which are operated by a remote control switch located at the welding gun. The power sources are normally connected by an electrode conductor to a portable wirefeed unit having wirefeed controls and to a remote welding gun. A ground return cable normally extends between the power source and the work piece. A 115 volt AC control cable normally extends between the power source and the portable control unit for energizing a wirefeed motor, having a related wirefeed mechanism and welding contactor control circuitry. These AC cables are generally hazardous and their maintainence constitutes an important factor in efficiency, productivity and cost, especially in welding large structures such as bridges, ships, tanks, pipe lines and the like. It is therefore desirable to eliminate the 115 volt AC control cables which are cumbersome, dangerous and susceptible to being severed or otherwise damaged.

Previous to this invention, elimination of such 115 volt AC supply control cables has been accomplished by the so called "arc voltage system" utilizing a direct current motor for driving a wirefeeding mechanism and operably powered from the low voltage in the welding current cable. However such prior system disadvantageously maintains the main contactors closed so that the welding gun cables and the welding wire are energized or "hot" at all times. This gives rise to a very dangerous condition whereby accidental touching of the wire or gun tip to the work or surrounding grounded structures can cause instantaneous arcing and serious damage to the wirefeed system including "burn back" of the wire in the gun tip and possible damage to the operator's eyes.

Of further importance, known prior art portable wirefeed and control devices have been limited in their use to either AC or DC power supplies, usually of a specific type, thereby restricting their usefulness.

SUMMARY OF THE INVENTION

This invention is directed to an improved arc welding system and control apparatus which eliminates the need for a power source having internal or external welding current control contactors and which also eliminates 115 volt AC control cables extending between the portable wirefeeder and power source while avoiding operating conditions wherein the welding gun cable and welding wire are "hot" or energized at all times.

In brief the present invention overcomes the above discussed difficulties of the prior art by providing a portable wirefeeder and control unit incorporating welding current control contactors operable in response to the operation of a switch located at a remote welding gun and powered by low voltage energy carried in the welding current cable. All electrical functions of the wirefeeder are operated by this same low voltage including a wirefeed motor and operating controls therefor. Importantly the wirefeeder and control unit of this invention is useful with any type of welding power source, consequently it must operate with a wide variety of input voltages and power conditions including standard or reverse polarity DC, AC voltages from 15–100 volts, large high voltage spikes and low voltage drops. In order for the unit to operate under these varying conditions the welding voltage is processed by a voltage regulator circuit which protects internal electrical components of the wirefeeder and control unit including the wirefeed motor and its operating controls from excessive voltages and high voltage spikes inherent to some power sources. Solid state electronic components are employed in the control circuits and suitable protective circuitry is provided to maintain circuit integrity. The voltage control circuitry permits the system of this invention to utilize any conventional power source typically used with other wirefeeders including power sources conventional to stick-SAM welding and single or multi-user grid systems without modification to either the power source or the wirefeeder and control unit of this invention. The familiar 115 volt AC control cable between the power source and the portable wirefeeder and control unit of this invention is eliminated. Instead all control power is supplied by a single electrode power conductor extending between the power source and the control unit. A ground return conductor extends between the work piece and the power source and a remote welding gun is coupled to the control unit by suitable control conductors carried in a flexible conduit along with the electrode power cable, weld wire and optional shielding gas in a known manner. The power loop for the control unit and wire feeder is effected over a current path extending between the electrode power conductor and a convenient location of welding ground potential.

It is a principle object of this invention to provide a new and improved portable wirefeed and control unit for portable wirefeed arc welding systems which is capable of being powered by any conventional AC or DC welding power source.

Another important object of this invention is to provide an improved portable wirefeed and control unit as aforesaid incorporating welding power control contactors, a wirefeed motor, control circuitry therefor, voltage regulator and protective circuits and a supply of weld wire capable of being fed to a remote welding gun.

Still another object of this invention is to provide an improved portable wirefeed apparatus for portable wirefeed arc welding systems in which a wirefeed motor and welding current control means are powered at welding arc voltage energy levels.

A still further object of this invention is to provide an improved portable wirefeed arc welding system incorporating a portable control unit and wirefeed means connected to a power source by a single welding electrode power cable, and welding ground potential.

Having described this invention, the above and further objects, features and advantages thereof will appear from time to time from the following detailed description of a preferred embodiment thereof illustrated in the accompanying drawings and representing the best mode presently contemplated for enabling those of skill in the art to make and practice this invention.

IN THE DRAWINGS

Figure 2:
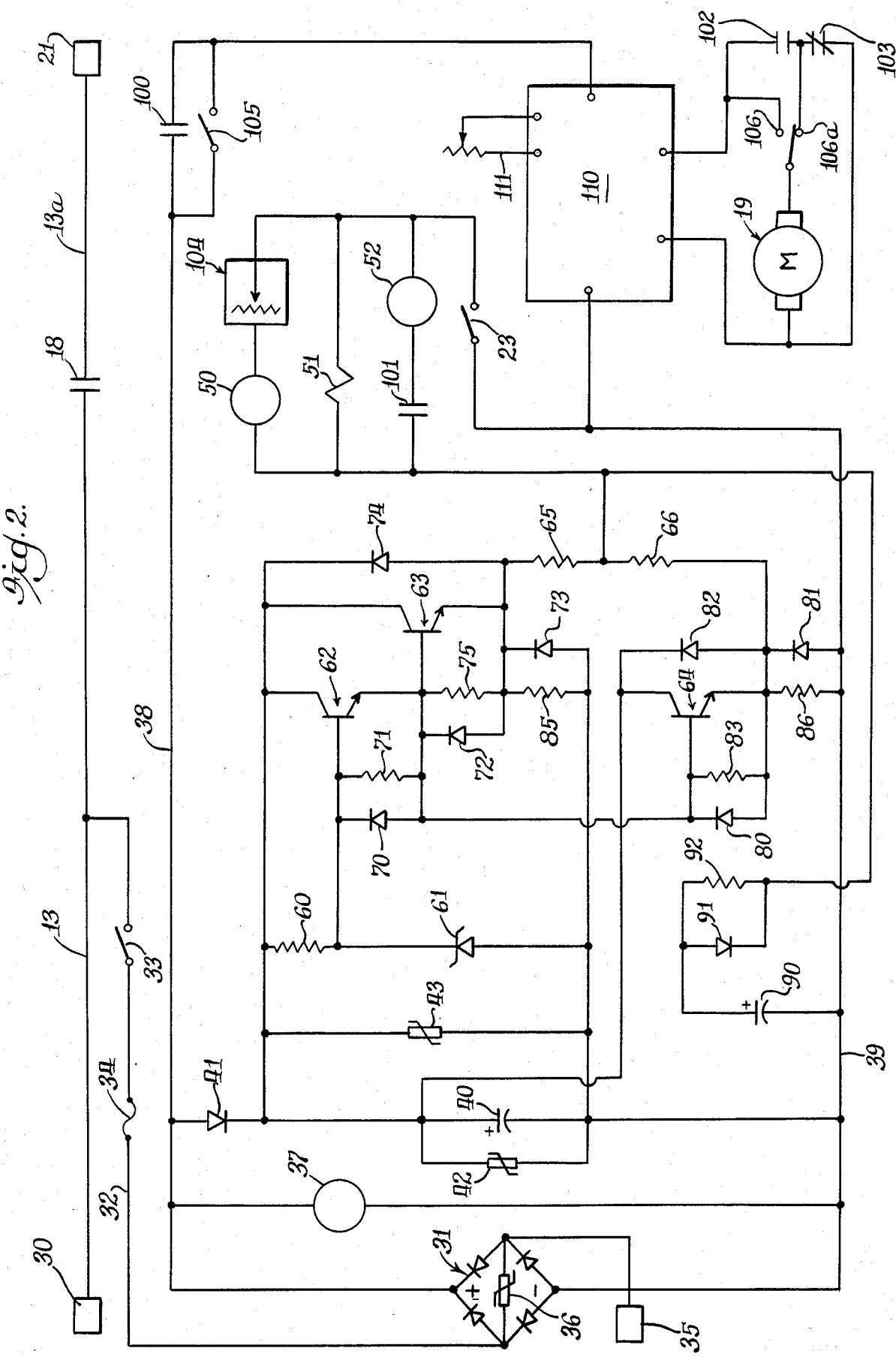

FIG. 1 is a schematic view of an arc welding system in accordance with this invention; and FIG. 2 a schematic circuit diagram of the portable wirefeed and control unit represented in FIG. 1.

Turning initially to FIG. 1 which sets forth the generalities of the improved portable arc welding system according to this invention, it will be understood that a conventional welding power source 10 supplying either AC or DC welding electrode energy is electrically coupled to the work 11 by ground cable 12 and by a single electrode power cable 13 to a portable control and wirefeeder unit 15 coupled to a remote welding gun 16. The wirefeeder and control unit 15 includes control circuit means 17, welding power control contactors 18 for controlling energization of the welding electrode, a wirefeed drive motor means 19 accompanied by a reel of wire 20; the weld wire 20 extending through a power block 21 in circuit with electrode power cable section 13a and contactors 18. A suitable flexible conduit (not shown) is coupled to block 21 and carries electrode power cable 13b and the electrode wire 20 to the welding gun 16 in a conventional manner. A control conductor 22 extends from a trigger control switch 23 at the gun 16 to the control means 17 of the wirefeeder unit and a ground conductor 24 extends between the control unit 17 and a convenient location at welding ground potential, such as the work piece illustrated.

The use of shielding gas is contemplated as an optional feature and a suitable system therefor is illustrated in FIG. 1 as comprising a supply of gas 25 which flows through a regulator 26, flow meter 27 and solenoid operated control valve 28 via a gas line 29 which is joined with the electrode power cable 13b and weld wire 20 and control conductor 22 in the flexible conduit to supply gas to the welding gun.

From the aforedescribed it will be recognized that the usual 115 volt AC control cable which familiarly extends between the power source 10 and the remote wirefeed unit and more particularly the welding contactors thereof has been eliminated in the present system. Instead this invention employs low voltage contactors 18, disposed internally of the feeder and control unit 15 and powered off of the low voltage loop between the electrode supply cable 13 and control conductor 24 at welding ground potential. The welding gun 16, the electrode power cable 13b and the welding wire 20 are all separated from the main electrode power cable 13 by the normally open welding contactors 18 which respond to control operation of the welding gun switch means 23. Closing activity of the gun switch causes contactors 18 to close to supply welding current power to cable 13b, gun 16 and welding wire 20. It also serves to energize the wirefeed motor drive means 19, thereby feeding weld wire to the weld gun 16.

The schematic diagram of FIG. 2 illustrates the electrical circuitry of the wirefeeder unit and more specifically sets forth the features of the control means 17 therein. As shown, welding potential is coupled to the unit 15 by input connector 30 which is joined to the welding electrode supply cable 13. Such potential is applied to the open contacts of the welding contactor 18. Cable section 13a power block 21, the power section cable 13b, welding wire 20, and weld gun 16 are isolated from the power supply at this stage by the open contacts 18. Welding potential is applied to a full-wave bridge rectifier 31 over conductor 32 joined to conductor 13 and having a line control on/off switch 33 and fuse 34. When the on/off switch 33 is closed welding potential is applied to the bridge rectifier 31 through line fuse 34 with the return current path from the bridge rectifier being completed over the control conductor 24 at welding ground potential via connector jack 35.

When the input power to the bridge rectifier is DC, depending on either standard or reverse polarity applications, rectifier 31 directs the positive potential from either input jack 30 or 35 to its positive terminal and the negative potential side (either connector jack 30 or 35 as the case may be) to its negative terminal. If the input power is AC, the bridge rectifier rectifies and directs the current to its proper terminals to provide pulsating DC energy. Varistor 36 is coupled between the line terminals of the bridge rectifier to protect the circuitry thereof from high voltage spikes.

Volt meter 37 indicates the amount of welding voltage supplied from the welding power supply and is coupled to the positive and negative output conductors 38 and 39 of the bridge rectifier, respectively.

A first storage capacitor 40 is connected between the conductors 38 and 39 over a diode 41; the capacitor 40 being in parallel circuit with varistors 42 and 43. Capacitor 40 is charged over the diode 41 and the varistors 42 and 43 serve to protect the capacitor from external and internally generated high voltage spikes. Energy stored in the capacitor 40 serves to maintain proper load circuit functions during power fluctuations, as for example, low voltage fluctuation developed at arc initiation.

A voltage regulator means is provided to supply power to a load circuit which comprises a control relay coil 50, gas solenoid valve 51, and welding contactor relay coil 52, operable in response to closure of the weld gun trigger switch 23. This voltage regulator means limits the voltage supplied to such load components at approximately 24 volts and protects such components from overload as necessary since some welding power sources have open circuit (nonwelding) voltages as high as 80 volts which would damage these components.

The voltage regulator means functions as follows:

Current limiting resistor 60 in series with a zener diode 61 serves to limit current through the latter for purposes of limiting the voltage applied to the base of a driver transistor 62 to a level of approximately 25 volts. Transistor 62 is forward biased and its emitter supplies base current to power transistors 63 and 64 at a level of approximately 24.3 volts. The power transistors 63 and 64 are in parallel with their emitters in series with resistors 65 and 66 respectively; which serve to balance the load between the transistors 63 and 64 in operation (such load comprising the components 50, 51 and 52 as previously described.)

Power transistor 62 is protected by a diode 70 in parallel with resistor 71. Diodes 72, 73 and 74 in conjuction with resistor 75 constitute a protection circuit for transistor 63. A corresponding protection circuit for transistor 64 comprises diodes 80, 81 and 82 and resistor 83. Diodes 73 and 81 also serve to direct any negative spikes, induced by the load, back to the load when the trigger switch 23 is closed. Additional resistors 85 and 86 constitute load resistors that maintain a small current path when the trigger switch 23 is open.

Basically the several named components 60–86 constitute the voltage regulator means of this invention.

In addition to the voltage regulator circuitry just described, a second capacitor 90 in circuit with a diode 91 and a resistor 92 form a second circuit to maintain current through the load particularly during voltage dips, reinforcing the load maintaining activity of the primary capacitor 40. The functioning of the protective circuit 90, 91 and 92 is particularly important with respect to the welding contactor coil 52 for holding such coil energized in the presence of or during low voltage fluctuations, as caused by arc initiation spot welding or similar events. Capacitor 90 charges through the resistor 92 and discharges through the diode 91 and is in circuit with the junction between the output resistors 65 and 66 for the two power transistors 63 and 64. Thus if the output of the power transistors and the junction between the load balancing resistors 65 and 66 should go low, falling below the charging voltage of approximately 23.6 volts for capacitor 90, the latter discharges directly to the load to maintain a holding circuit for the contactor coil 52.

In addition to the voltage regulator and protective circuitry described, the schematic circuit of FIG. 2 also includes normally open relay contacts 100, 101 and 102 and normally closed relay contacts 103 which are responsive to actuation of the control relay coil 50; a pre purge time delay means 104 with manually set potentiometer, in series with a control relay coil 50; a manually operable inching switch having normally open contacts 105 and 106 and normally closed contacts 106a, and a pulse width modulated low voltage DC motor drive circuit 110 having motor speed control potentiometer 111 in circuit with the bridge rectifier 31 output conductors 38 and 39. The use and purpose of such components will appear presently.

USE AND OPERATION

With unit 15 properly connected to a suitable power source 10 and the power switch 33 closed the inch switch comprising the contacts 105 and 106 may be employed periodically to inch or feed cold wire to the weld gun by energizing the DC drive motor 19 and related wire drive mechanism of known construction. In this condition the control relay 50 is deenergized, the solenoid valve 51 is closed, the trigger switch 23 is open and the welding contactor control coil 52 is deenergized. Inch switch contacts 105 are in direct circuit with the power supply conductor 38 so that when the inch switch contacts 105 are closed energy is supplied to the pulse width modulated motor control circuit means 110 of known construction. Circuit from the control circuit 110 to the wirefeed motor 19 is completed through the normally open contacts 106 of the inch switch which close with contacts 105 thereby energizing the motor and feeding cold weld wire to the weld gun.

When the inch switch is released or opened its primary contacts 105 open, interrupting current flow to the motor control circuit 110. The secondary contacts 106 thereof return to open position as illustrated in FIG. 2 closing contacts 106a to form a short circuit through the normally closed relay contact 103 around the motor and thereby providing a dynamic breaking circuit to stop the motor.

When welding operation is desired, the manually operated trigger switch 23 at the welding gun is closed to complete the load circuit thereby energizing the solenoid valve 51 and permitting the shielding gas to flow to the weld gun. The pre purge time delay means 104 times out, depending on the setting of its potentiometer, and thereby permits energization of the control relay 50. When this occurs the normally open relay contacts 100 and 102 close and the normally closed contacts 103 thereof open, to supply power to the motor drive control circuit 110 and energize motor drive means 19. With energization of motor drive means 19, electrode welding wire 20 is fed through the welding gun. With energization of relay 50 the normally open control relay contacts 101 thereof also close to energize the welding contactor relay coil 52, closing welding control contacts 18. Welding current is thus supplied to the power block 21, energizing the electrode wire 20 and electrode cable section 13b. As soon as the weld wire engages the work, it causes an immediate voltage drop or dip which in some instances may be as low as 0 volts for a short period of time. When the voltages dips, the capacitor 40 discharges through transistors 63 and 64 and resistors 65 and 66 to maintain current through the load components 50, 51 and 52 as previously described. This function is backed up by the secondary capacitor 90. Importantly the control relay 50 must deenergize before the welding contactor coil 52 deenergizes and of equal importance the control relay 50 must not energize until there is enough power to energize the contactor coil 52. This protects the welding contacts 18 from welding together as they would if the contactor coil 52 were allowed to stay in circuit with the control relay contacts 101 and closed switch 23 until the coil 52 were fully deenergized.

In operating a system according to this invention marked ease of arc initiation is exhibited, particularly in difficult processes such as aluminum welding along with smooth welding characteristics especially in constant current (variable voltage) welding applications. These desirable results are accomplished by sampling the arc voltage and using it to make small adjustments in the wirefeed speed which is basically regulated by setting the potentiometer 111 having high and low trim pots in association with the motor control circuit 110.

In conventional wirefeed systems, wirefeed speeds normally are maintained as constant as possible without regard to other factors. Since the parameters in a welding process such as voltage, amperage and wirefeed speed are selected to produce a desired weld, change in one of the parameter will effect changes in the weld. In constant current welding, the welding current is selected and held relatively constant by the power source. The wirefeed speed controls the amount of wire used and the voltage is dependant on the current selected and the wirefeed speed. The welding parameters are selected to produce a desired welding characteristic and once selected should remain relatively constant during the welding processes. There are other variables however which effect welding parameters namely work material cleanliness, welding wire impurities, wire electrode extension, welder expertise and like factors. These factors effect changes in the arc voltage and if the wirefeed speed remains constant, as it does in conventional wirefeed systems, it can cause undesirable changes in weld characteristics. In this system, however, welding voltage changes adjust a portion of the wirefeed speed through the pulse width modulated motor drive circuit which reacts to arc voltage variations to effectly adjust wirefeed rate, thereby tending to stabilize the weld characteristics and produce a more desirable welding product.

From the foregoing it is believed that those familiar with the art will readily understand and appreciate the novel control and wirefeed system of this invention and recognize that while the same as been described in association with a particular preferred embodiment thereof illustrated in the accompanying drawings and described heretofore, the same is susceptable to variation, modifications and substitution of equivalence without departure from the spirit and scope of the invention which is intended to be unlimited from the foregoing except as may appear in the following appended claims.

I claim:

1. In a consumable wire electrode arc welding system having a welding power source, a portable wirefeed unit and a remote welding gun with a normally open trigger switch, a single electrode power cable interconnecting the power source to the wirefeed unit and to said gun, a ground cable interconnecting the power source and a work piece to be welded, and control cables interconnecting the wirefeed unit with said trigger switch and welding ground potential, improved wirefeed and welding control apparatus comprising: rectifier means coupled to the electrode power cable for energization by either AC or DC power carried thereby and productive of a low voltage DC output, capacitor means in circuit with the output of said rectifier means, voltage regulator means in circuit with said capacitor means and the output of said rectifier means for providing low voltage power to load components comprising control relay means and welding contactor control means; wirefeed drive motor means in circuit with the output of said rectifier means and operable to feed electrode wire to the welding gun, and welding contactors in circuit with the electrode power cable and welding gun and operable to control energization of the welding wire electrode; said capacitor means serving to reinforce the output of said voltage regulator means to maintain said control relay means and welding contactor control means energized during low voltage dips, such as at welding arc initiation; energization of said control relay means and welding contactor control means being selectively controlled by the welding gun trigger switch.

2. The combination of claim 1, and electrically operable shielding gas control valve means in circuit with the output of said voltage regulator means for supplying shielding gas to the electrode wire at the welding gun, and time delay means preventing energization of said control relay means and welding contactor control means for a predetermined time interval following energization of said gas control valve means.

3. The combination of claim 1 wherein energization of said welding contactors and wirefeed drive motor means is controlled by relay contacts operably responsive to energization of said control relay means.

4. The combination of claim 3, and manually operable switch means bypassing the said relay contacts in circuit with said motor means for effecting selected energization thereof in the absence of energization of said control relay means whereby to feed non-energized electrode wire to the weld gun.

5. The combination of claim 1 wherein said drive motor means comprises a pulse width modulated motor drive circuit means in direct circuit with said rectifier means and welding ground potential and including motor speed control means for controlling operation of a DC wirefeed drive motor and thus the wirefeed rate, operation of said motor drive circuit means being controlled by energization of said control relay means following circuit closing operation of the welding gun trigger switch means.

6. The combination of claim 1 wherein the output of said voltage regulator means is in the order of 25 volts and said control relay means and welding contactor control means are operated at such voltage levels.

* * * * *